US008846252B2

(12) United States Patent
Wetzel et al.

(10) Patent No.: US 8,846,252 B2
(45) Date of Patent: Sep. 30, 2014

(54) BATTERY ELECTRODE AND METHOD FOR MANUFACTURING SAME

(75) Inventors: Dennis A. Wetzel, Saline, MI (US); Ramachandran Subbaraman, Fox Point, WI (US); Christopher P. Kaniut, Saline, MI (US); William J. Ross, Mukwonago, WI (US); Annette Holbrook, Northville, MI (US); Jerome R. Heiman, Campbellsport, WI (US); Eric A. Sattler, Romulus, MI (US); Derrick L. Jennings, Maumi, OH (US); Donald Hennessey, Jr., Lambertville, MI (US)

(73) Assignee: Johnson Controls Technology Company, Holland, MI (US)

( * ) Notice: Subject to any disclaimer, the term of this patent is extended or adjusted under 35 U.S.C. 154(b) by 233 days.

(21) Appl. No.: 13/202,530

(22) PCT Filed: Nov. 19, 2009

(86) PCT No.: PCT/US2009/065108
§ 371 (c)(1),
(2), (4) Date: Oct. 28, 2011

(87) PCT Pub. No.: WO2010/098796
PCT Pub. Date: Sep. 2, 2010

(65) Prior Publication Data
US 2012/0040251 A1     Feb. 16, 2012

Related U.S. Application Data

(60) Provisional application No. 61/155,763, filed on Feb. 26, 2009.

(51) Int. Cl.
*H01M 4/72*     (2006.01)
*H01M 4/02*     (2006.01)

(52) U.S. Cl.
CPC .. *H01M 4/72* (2013.01); *H01M 4/02* (2013.01)
USPC ............................ 429/235; 429/233; 429/245

(58) Field of Classification Search
CPC .................................. H01M 4/72; H01M 4/02
USPC ........................................... 429/233, 235, 245
See application file for complete search history.

(56) References Cited

U.S. PATENT DOCUMENTS

| 3,486,940 A | 12/1969 | Ruben |
| 4,205,122 A | 5/1980 | Miura et al. |

(Continued)

FOREIGN PATENT DOCUMENTS

| CN | 1276920 A | 12/2000 |
| CN | 1526177 A | 9/2004 |

(Continued)

OTHER PUBLICATIONS

International Preliminary Report on Patentability for International Appln. No. PCT/EP2009/009130 dated Jun. 30, 2011.

(Continued)

*Primary Examiner* — Tracy Dove
(74) *Attorney, Agent, or Firm* — Boardman & Clark LLP

(57) ABSTRACT

A battery electrode with a pasting textile, fabric, or scrim made with an electrode grid (e.g., a stamped grid or expanded metal grid) coated in battery electrode and covered with pasting textile formed of a bonded, non-woven fiber web. The web is formed from one or more fibers with an average length greater than 20 μm. In various embodiments, the web is formed from one or more spun, continuous fibers. The battery electrode may be made in a continuous process where multiple grids are formed in a single sheet, coated with electrode active material, and the scrim before being cut into individual electrodes.

11 Claims, 14 Drawing Sheets

(56) References Cited

U.S. PATENT DOCUMENTS

| | | |
|---|---|---|
| 4,215,190 A | 7/1980 | Ferrando |
| 4,342,343 A | 8/1982 | Clague et al. |
| 5,294,319 A | 3/1994 | Kaczur et al. |
| 5,348,817 A | 9/1994 | Rao et al. |
| 5,580,685 A | 12/1996 | Schenk |
| 5,804,254 A | 9/1998 | Nedwick et al. |
| 6,096,179 A | 8/2000 | Fajt et al. |
| 6,120,939 A | 9/2000 | Whear et al. |
| 6,509,118 B1 | 1/2003 | Pavlov et al. |
| 6,531,248 B1 | 3/2003 | Zguris |
| 6,790,561 B2 | 9/2004 | Gan et al. |
| 6,803,439 B2 | 10/2004 | Taylor |
| 6,804,108 B2 | 10/2004 | Nanjundiah et al. |
| 6,939,645 B2 | 9/2005 | Sugiyama |
| 7,116,545 B2 | 10/2006 | Farahmandi et al. |
| 7,132,195 B2 | 11/2006 | Hottori |
| 7,517,370 B2 | 4/2009 | Petersen et al. |
| 7,981,818 B2 | 7/2011 | Justice |
| 8,012,629 B2 | 9/2011 | Zguris |
| 8,057,860 B2 | 11/2011 | Charbonneau |
| 8,221,920 B2 | 7/2012 | Kawachi et al. |
| 2004/0160156 A1 | 8/2004 | Ohata et al. |
| 2004/0265699 A1 | 12/2004 | Choi et al. |
| 2006/0166074 A1 | 7/2006 | Pan et al. |
| 2008/0096103 A1 | 4/2008 | Naarmann |
| 2009/0258274 A1 | 10/2009 | Uensel et al. |
| 2010/0259866 A1 | 10/2010 | Shaffer et al. |

FOREIGN PATENT DOCUMENTS

| | | |
|---|---|---|
| CN | 1725523 A | 1/2006 |
| CN | 101030642 A | 9/2007 |
| CN | 101039968 A | 9/2007 |
| DE | 1 162 895 | 12/1958 |
| DE | 2 003 131 | 1/1970 |
| DE | 2 137 908 | 7/1971 |
| DE | 2 205 609 | 2/1972 |
| DE | 10 2005 039 709 A1 | 8/2005 |
| EP | 0 109 588 A2 | 5/1984 |
| EP | 0109588 | 5/1984 |
| EP | 432501 A2 | 11/1990 |
| EP | 0850493 | 7/1998 |
| EP | 1 241 720 A2 | 9/2002 |
| FR | 2 492 172 A1 | 4/1982 |
| GB | 762 461 A | 11/1956 |
| GB | 1 362 662 A | 8/1974 |
| GB | 2 081 491 A | 2/1982 |
| JP | 55016364 | 2/1980 |
| JP | 57069664 | 4/1982 |
| JP | 59 029 369 A | 2/1984 |
| JP | 6140651 | 7/1985 |
| JP | 60 202 665 A | 10/1985 |
| JP | 60257071 | 12/1985 |
| JP | 61128461 | 6/1986 |
| JP | 62103976 | 5/1987 |
| JP | 63 187561 A | 8/1988 |
| JP | 63-213265 | 9/1988 |
| JP | 63 279568 A | 11/1988 |
| JP | 01 019678 A | 1/1989 |
| JP | 5054874 A | 3/1993 |
| JP | 6223798 A | 8/1994 |
| JP | 08-180851 A | 7/1996 |
| JP | 11 040133 A | 2/1999 |
| JP | 2001273886 A | 10/2001 |
| JP | 2002-110132 | 4/2002 |
| JP | 2004-535047 A | 11/2004 |
| JP | 2006196751 A | 7/2006 |
| JP | 2007087871 A | 4/2007 |
| KR | 100250381 B1 | 1/2000 |
| KR | 1020050041594 A | 5/2005 |
| KR | 1020060054849 A | 5/2006 |
| KR | 1020060063288 A | 6/2006 |
| KR | 1020060097779 A | 9/2006 |
| KR | 100653246 B1 | 11/2006 |
| KR | 1006459700000 | 11/2006 |
| KR | 1006466530000 | 11/2006 |
| KR | 1020060112439 A | 11/2006 |
| KR | 1020060112440 A | 11/2006 |
| KR | 1020060112441 A | 11/2006 |
| KR | 1020070001331 A | 1/2007 |
| KR | 1020070010632 A | 1/2007 |
| KR | 1020070029944 A | 3/2007 |
| KR | 1020070029951 A | 3/2007 |
| KR | 1020070029952 A | 3/2007 |
| KR | 1020070029953 A | 3/2007 |
| KR | 1020070029954 A | 3/2007 |
| KR | 1020070031033 A | 3/2007 |
| KR | 1020070069498 A | 7/2007 |
| KR | 1020070076651 A | 7/2007 |
| KR | 1020070113598 A | 11/2007 |
| KR | 2020080001708 A | 6/2008 |
| KR | 1010236760000 | 3/2011 |
| KR | 1010236770000 | 3/2011 |
| KR | 1010236780000 | 3/2011 |
| KR | 1020110023394 A | 3/2011 |
| WO | WO 94/17224 | 8/1994 |
| WO | WO 98/01914 | 7/1996 |
| WO | WO 00/08704 A1 | 2/2000 |
| WO | WO 00/75403 A1 | 12/2000 |
| WO | WO 01/35474 A1 | 5/2001 |
| WO | WO 01/90444 A1 | 11/2001 |
| WO | WO 03/007404 | 1/2003 |
| WO | WO 03/007404 A1 | 1/2003 |
| WO | WO 2005/035841 A2 | 4/2005 |
| WO | WO 2007/024245 A1 | 3/2007 |
| WO | PCT/US2007/011577 | 5/2007 |
| WO | WO 2007/125282 A2 | 11/2007 |
| WO | WO 2007/136613 | 11/2007 |
| WO | WO 2008/051219 A1 | 5/2008 |
| WO | WO 2010/059729 A1 | 5/2010 |

OTHER PUBLICATIONS

Patrice Simon and Andrew Burke, "Nanostructured Carbons: Double-Layer Capacitance and More," The Electrochemical Society Interface, Spring 2008, pp. 38-43.

International Search Report for International Application No. PCT/US09/065108 dated Feb. 3, 2010.

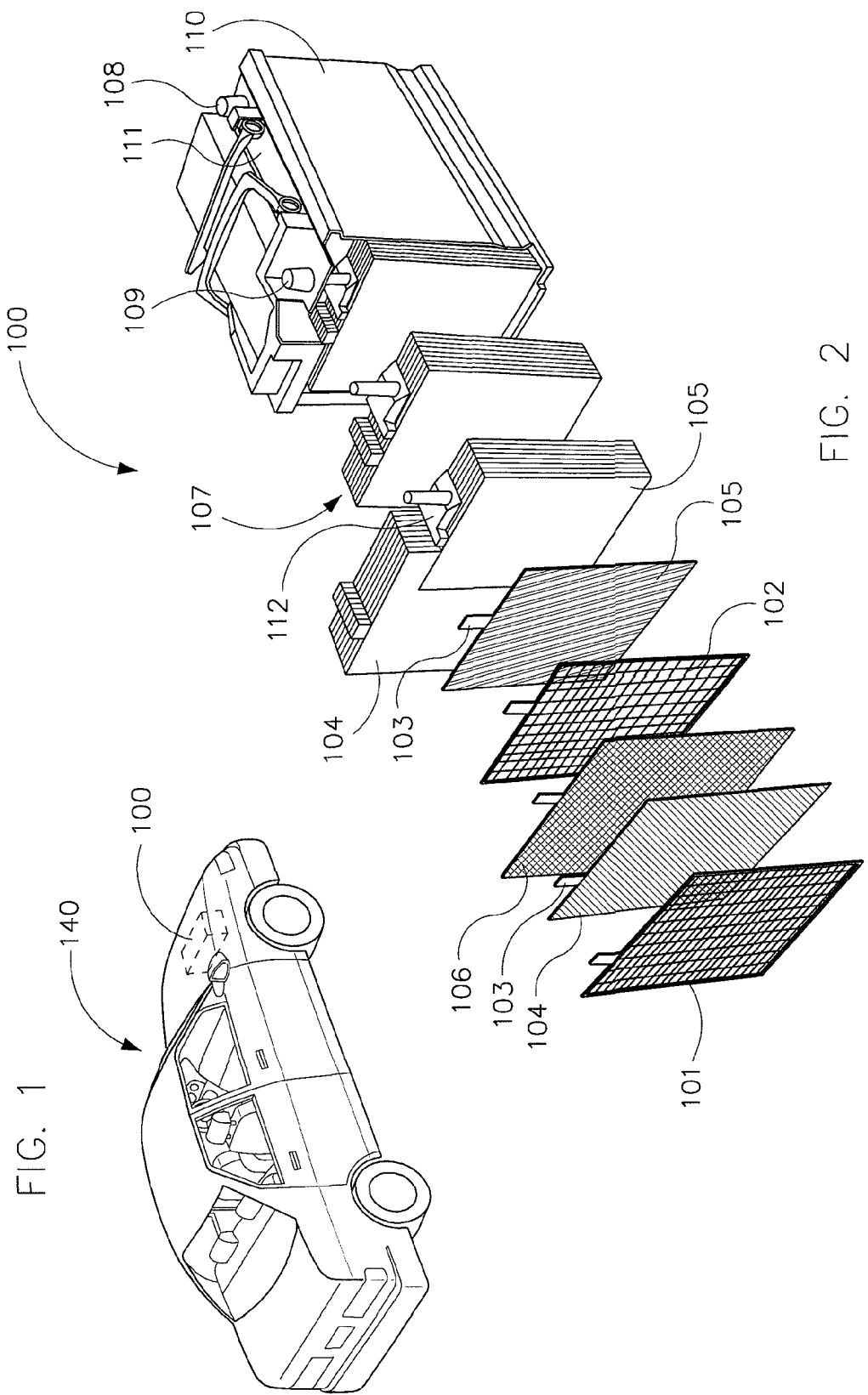

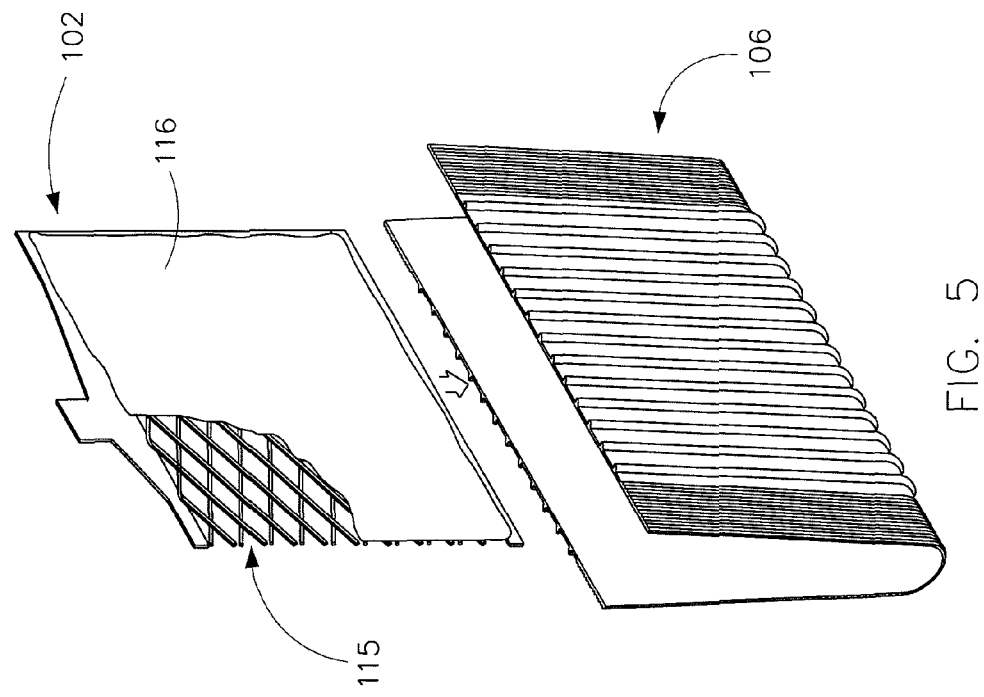
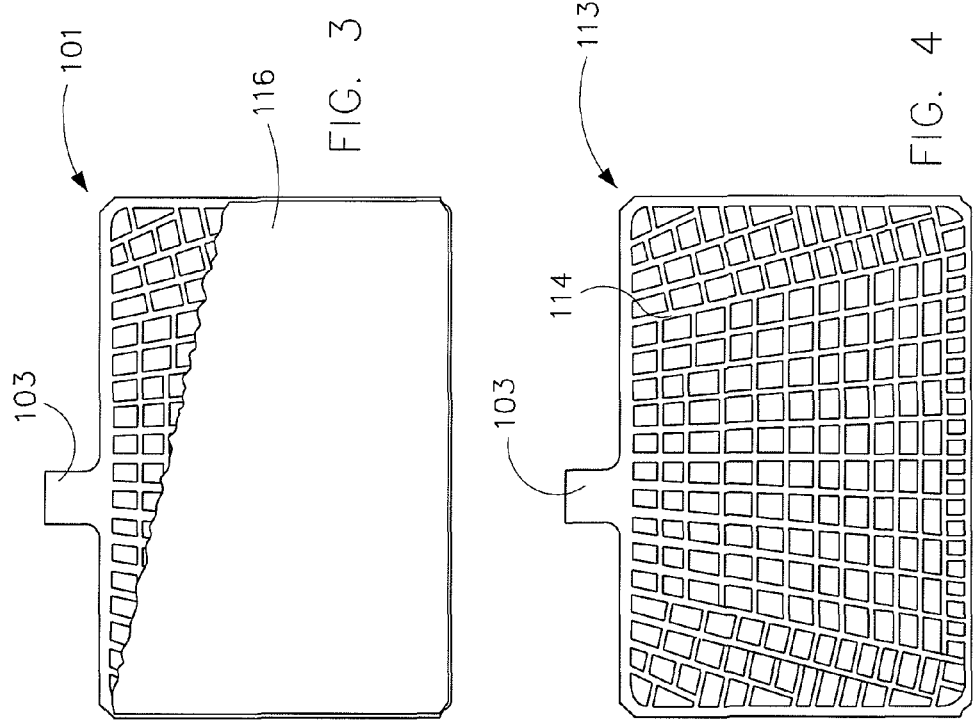

BATTERY ELECTRODE AND METHOD FOR MANUFACTURING SAME

PRIORITY

This application claims priority to U.S. Provisional Application 61/155,763 filed Feb. 26, 2009, which is incorporated herein by reference in its entirety.

FIELD

The present disclosure relates to the field of batteries (e.g., lead-acid batteries including batteries for vehicle starting, lighting and ignition applications; marine batteries; commercial batteries; industrial batteries; batteries for use with hybrid-electric vehicles, microhybrid vehicles, etc.). The present disclosure more specifically relates to electrodes or plates including a pasting textile or scrim, or otherwise having a pasting textile or scrim provided thereon.

BACKGROUND

To prevent the separation of active material from grids and electrodes or plates and/or to ensure easy handling of the active material in the manufacture of electrodes or plates for batteries, it is known to provide for a pasting material or paper that may be adhered as a support to the active material after it is deposited on grid substrates. It is also known to embed in active material a pasting material formed of polyesters, polypropylenes, or viscous rayon, instead of paper, to prevent or reduce separation and handling problems. Such pasting papers and fabrics do not realize certain advantageous features (and/or combinations of features).

OUTLINE OF BASIC AND OTHER ADVANTAGEOUS FEATURES

It would be desirable to provide a battery, an electrode, and/or a pasting textile or scrim or the like of a type disclosed in the present application that includes any one or more of these or other advantageous features:

1. A pasting textile that improves acid transport over conventional pasting materials;
2. A pasting textile that better adheres to the active material of an electrode compared to conventional pasting material;
3. A pasting textile that allows for enhanced capillary action compared to conventional pasting material;
4. A pasting textile that provides for enhanced plate strength and/or integrity over conventional pasting material;
5. An electrode that allows for enhanced conductivity and capacitance;
6. A pasting textile that may be utilized during high speed continuous manufacture of positive and negative electrodes;
7. A pasting textile with material properties that require lower flash-drying and/or oven drying temperatures (200 to 400 deg. F.) compared to conventional pasting material;
8. A pasting textile that may be utilized under higher plate manufacturing line speeds while reducing line interruptions and breakage;
9. A pasting textile with material properties that require or allow for shortened plate curing and drying processes, and/or a reduction in curing time;
10. A pasting textile that enhances the oxidative reactions in the battery compared to conventional pasting materials;
11. A pasting textile that improves cyclability by helping better retain active material and limiting active material shedding;
12. A pasting textile that can allow for the elimination of specific glass-mat separators in cyclic applications;
13. A pasting textile that can allow for the reduction of lead in electrodes and batteries (e.g., by allowing use of thinner grids);
14. Electrodes that generate or exhibit higher reserve capacity ("RC");
15. Electrodes that generate or exhibit higher cycling or 20-hour rate capacity ("C20 capacity");
16. A pasting textile that mitigates acid stratification in a variety of applications, including stop/start and microhybrid applications;
17. A pasting textile that extends the serviceable life of a battery;
18. A pasting textile that improves manufacturing processes by, in part, reducing the generation of airborne lead particles and other exposed lead, and/or lowering lead-in-air emissions, and potential fire hazards (e.g., baghouse fires) more common to conventional pasting paper;
19. A pasting textile that can improve formation efficiency and active material conversion in battery electrodes;
20. A pasting textile that reduces battery scrap (e.g., by reducing number of batteries that may need to be scrapped due to cast-on strap weld interference that can result from use of conventional pasting materials) and/or improves scrap recovery;
21. A replacement or substitute for conventional pasting material that leads to one or more of the above-described advantages, and may be used in connection with conventional battery manufacturing systems and processes;
22. A pasting textile that replaces both the conventional pasting paper and glass mat separator;
23. A pasting textile that improves reserve capacity;
24. A pasting textile that reduces manufacturing costs related to material costs, processing speed, and cleanliness;
25. A pasting textile that can be manufactured with reduced stacker downtime and maintenance delays; and
26. A pasting textile that allows use of a lead-acid battery in applications with higher cycling requirements than conventional lead-acid batteries can achieve.

SUMMARY OF THE INVENTION

An exemplary embodiment relates to a battery electrode comprising a grid, an active material provided on the grid, and a pasting textile provided on or into the active material wherein the pasting textile includes a fiber web including one or more fibers with an average length greater than 20 µm and the fibers are greater than about 2 denier per fiber.

Another exemplary embodiment relates to a battery electrode comprising a grid having a length and a width, an active material provided on the grid, and a pasting textile provided on or into the active material wherein the pasting textile includes a fiber web including one or more fibers with an average length of approximately half of the sum of the length and the width of the grid.

Another exemplary embodiment relates to a battery electrode comprising a grid having a perimeter, an active material provided on the grid, and a pasting textile provided on or into the active material wherein the pasting textile includes a fiber web including one or more fibers with a first end and a second end and wherein the first end of each fiber is positioned substantially near the perimeter of the grid.

Another exemplary embodiment relates to a method of manufacturing battery electrodes comprising providing a lead sheet; stamping the lead sheet to form one or more grids; providing the one or more grids with an active material; forming a pasting textile from a spun, continuous fiber; providing the pasting textile on a surface of the sheet of one or more grids; and cutting the sheet of one or more grids with active material and pasting textile provided thereon.

These and other features and advantages of various embodiments of systems and methods according to this invention are described in, or are apparent from, the following detailed description of various exemplary embodiments of various devices, structures, and/or methods according to this invention.

BRIEF DESCRIPTION OF THE DRAWINGS

Various exemplary embodiments of the systems and methods according to the present disclosure will be described in detail, with reference to the following figures, wherein:

FIG. 1 is an isometric view of a vehicle including a battery according to an exemplary embodiment;

FIG. 2 is an isometric exploded cut-away view of a portion of a battery according to an exemplary embodiment;

FIG. 3 is a front plan cut-away view of a portion of a battery plate or electrode (e.g., positive battery plate) comprising a stamped grid and active material according to an exemplary embodiment;

FIG. 4 is a front plan view of a stamped grid (e.g., positive grid) according to an exemplary embodiment;

FIG. 5 is an isometric exploded cut-away view of a battery plate or electrode (e.g., negative battery plate) and separator according to an exemplary embodiment;

Figure 7:
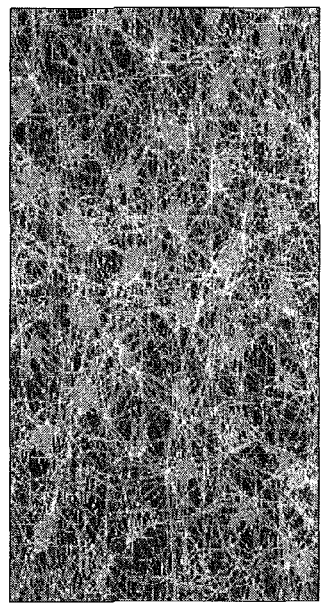
FIG. 7 is a detailed view of the pasting textile represented in FIG. 6, magnified about 10×.
Figure 8:
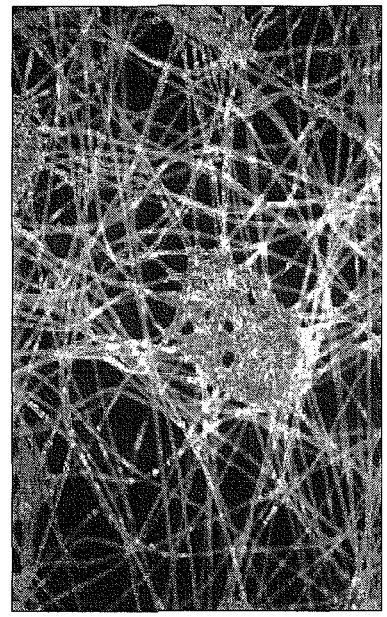
FIG. 8 is a detailed view of a portion of the pasting textile depicted in FIG. 7.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION OF THE PREFERRED EMBODIMENTS

Referring to FIG. 1, a vehicle 140 is shown that includes a battery 100 according to an exemplary embodiment. While vehicle 140 is shown as an automobile, according to various alternative embodiments, the vehicle may include any variety of types of vehicles including, among others, motorcycles, buses, recreational vehicles, boats, and the like. According to an exemplary embodiment, vehicle 140 uses an internal combustion engine (not shown) for locomotive purposes.

Battery 100 shown in FIG. 1 is configured to provide at least a portion of the power required to start or operate vehicle 140 and/or various vehicle systems (e.g., starting, lighting, and ignition systems ("SLI")). Further, it should be understood that battery 100 may be utilized in a variety of applications not involving a vehicle, and all such applications are intended to be within the scope of the present disclosure.

Battery 100 shown in FIG. 1 may include any type of secondary battery (e.g., rechargeable battery). According to an exemplary embodiment, battery 100 includes a lead-acid storage battery. Various embodiments of lead-acid storage batteries may be either sealed (e.g., non-maintenance) or unsealed (e.g., wet).

Battery 100, according to an exemplary embodiment, is illustrated in FIG. 2. In various embodiments, battery 100 includes several cell elements which are provided in separate compartments of a container or housing 110 containing electrolyte. The illustrations provided herein relate to automotive applications, wherein groups of 12-16 plates 104 and 105 are used in each of six stacks 107 for producing a standard automotive 12-volt battery. It will be apparent to those skilled in the art after reading this specification that the size and number of the individual plates 104 and 105, the size and number of plates 104 and 105 in any particular stack 107, and the number of stacks 107 used to construct battery 100 may vary widely depending upon the desired end use.

In various embodiments, battery housing 110 includes a box-like base or container and is made at least in part of a moldable resin. A plurality of stacks 107 or plate blocks are connected in series according to the capacity of the lead storage battery and are accommodated in the battery container or housing 110 together with the electrolyte, which is commonly aqueous sulfuric acid.

In various embodiments, battery 100 includes a compartment having a front wall, end walls, a rear wall, and a bottom wall. In various embodiments, five cell partitions or dividers are provided between the end walls, resulting in the formation of six compartments, as typically would be present in a twelve volt automotive battery. In other embodiments, the number of partitions and compartments may be varied to create batteries with different voltages. In various embodiments, a plate block or stack 107 is located in each compartment, each plate block or stack 107 including one or more positive plates 104 and negative plates 105, each having at least one lug 103, and a separator 106 placed or provided between each positive plate 104 and negative plate 105. In various exemplary embodiments, the positive plates 104 and negative plates 105 include a grid 101 and 102 with an attached lug 103 that are coated with positive or negative electrode active material or paste, respectively.

Cover 111 is provided for housing 110, and in various embodiments, cover 111 includes terminal bushings and fill tubes to allow electrolyte to be added to the cells and to permit servicing. To prevent undesirable spillage of electrolyte from the fill tubes, and to permit exhausting of gases generated during the electrochemical reaction, the battery may also include one or more filler hole caps and/or vent cap assemblies.

At least one positive terminal post 108 and negative terminal post 109 may be found on or about the top or front compartments of the battery. Such terminal posts 108 and 109 typically include portions which may extend through cover 111 and/or the front of battery housing 110, depending upon the battery design. In various embodiments, terminal posts 108 and 109 also extend through a terminal post seal assembly (not shown) to help prevent leakage of acid. It will be recognized that a variety of terminal arrangements are possible, including top, side, or corner configurations known in the art.

FIG. 2 also shows a conventional cast-on strap 112 which includes a rectangular, elongated body portion of a length sufficient to electrically couple each lug in a plate set and an upwardly extending member having a rounded top. FIG. 2 also illustrates a cast-on strap coupling lugs to be coupled to negative terminal post. As shown in FIG. 2, according to various embodiments, the cast-on strap includes a body portion coupling the respective lugs in the end compartments and a post formed therewith to protrude through a cover.

Each cell element or chapter includes at least one positive plate 104, at least one negative plate 105, and a separator 106 positioned between each positive plate 104 and negative plate 105. Separators 106 are provided between the plates to prevent shorting and undesirable electron flow produced during the reaction occurring in battery 100.

Positive and negative electrode plates 104 and 105 can be classified into various types according to the method of manufacturing the same. As one example, a paste type electrode is shown in FIGS. 3-5. In various embodiments, the paste type electrode includes a grid substrate and an electrochemically active material or "paste" 116 provided on the substrate. The grid may be formed of a soft alloy containing a trace of calcium for enhancing the mechanical strength of the substrate.

Referring to FIGS. 3-5, positive plates 104 and negative plates 105 each include a lead and/or lead alloy grid 113 and/or 115 that supports an electrochemically active material 116. The grids 113 and/or 115 provide an electrical contact between the positive or negative active materials or paste 116 which serves to conduct current. The grids 113 and/or 115 also serve as a substrate for helping support electrochemically active material 116 (e.g., paste) deposited or otherwise provided thereon during manufacture to form battery plates 104 and/or 105.

As set forth in greater detail below, known arts of lead acid battery grid making include: (1) batch processes such as book mold gravity casting; and (2) continuous processes such as strip expansion, strip stamping, continuous casting, and continuous casting followed by rolling. Grids made from these processes tend to have unique features characteristic of the particular process and behave differently in lead acid batteries, especially with respect to the pasting process. It should be appreciated that grids formed from any conventional or later-developed grid manufacturing process may be utilized, and it is not the intent to limit the invention to the grid design disclosed herein.

In various embodiments, at least some of the grids are stamped grids 113. FIG. 3 illustrates an exemplary embodiment of stamped grid 113 (e.g., a grid for a positive plate) with active material or paste 116 provided thereon. FIG. 4 illustrates stamped grid 113 shown in FIG. 3, but without active material. In various embodiments, stamped grid 113 includes a frame that includes a top frame element, first side frame element, second side frame element, and a bottom frame element. In various embodiments, stamped grid 113 includes grid wires 114 that define open areas that help hold the active material or paste 116 that helps provide current generation. In various embodiments, a current collection lug 103 is integral with the top frame element. While FIGS. 3-4 depict lug 103 as offset from the center of the top frame element, lug 103 may alternatively be centered or positioned closer to either the first or second side frame elements. The top frame element may include an enlarged conductive section at least a portion of which is directly beneath the lug to help optimize current conduction to the lug.

The bottom frame element may be formed with one or more downwardly extending feet (not shown) for spacing the remainder of the stamped grid away from the bottom of the battery container. In various embodiments, at least some of the grid wires 114 increase in cross-sectional area along their length from bottom to top or have a tapered shape so as to help optimize the current carrying capacity of wires 114 to help carry away increasing current being generated from the bottom to the top. The width and spacing of wires 114 between the first and second side elements may be predetermined so that there are substantially equal potential points across the width of stamped grid 113. To assist in supporting the electrochemical paste and/or permit the formation of paste pellets, in various embodiments, the stamped grid 113 also includes horizontal wires which are equally spaced apart and are parallel to the top and/or bottom frame elements. As shown in FIG. 3-4, however, at least some of the horizontal wires may not be equally spread apart or parallel to the top and/or bottom frame elements.

Various stamped grid designs may be utilized. See, e.g., U.S. Pat. Nos. 5,582,936; 5,989,749; 6,203,948; 6,274,274; 6,921,611; and 6,953,641 and U.S. patent application Ser. Nos. 10/996,168; 11/086,525; 10/819,489; and 60/904,404, each of which are incorporated herein by reference in their entireties. It should be noted that an infinite number of grid designs may be utilized and therefore, it is not the intent of the following description to limit the invention to the grid design shown in FIGS. 3-5, which are presented for the purposes of illustration.

An exemplary embodiment of an expanded metal grid 115 (e.g., a grid for the negative plate) is illustrated in FIG. 5. In various embodiments, the expanded metal grid has a pattern (e.g., a diamond pattern such as that shown in FIG. 5), which is well known in the art, with a bottom frame element and a top frame element that is integral with a lug.

Referring to FIGS. 3-5, the cross-section of the grid wires may vary depending upon the grid making process. To help improve adhesion of the battery paste, however, in various embodiments, the grid wires may be mechanically reshaped or refinished. It should be appreciated that any number of grid wire shapes may be utilized as long as the shape provides suitable paste adhesion characteristics. For example, the cross-section of wires may be of any cross-section design including substantially oval shaped, substantially rectangular, substantially diamond shape, substantially rhomboid shape, substantially hexagon shape, and/or substantially octagon shape. In the battery grid, each grid wire section may have a different cross-sectional configuration, or each grid wire section may have the same or a similar cross-sectional configuration. However, it is preferred that each grid wire section have the same cross-sectional configuration. Depending on the needs, a grid can be deformed at the vertical wire elements only, the horizontal wire elements only, or at both the vertical and horizontal wire elements.

Active material or paste 116 is typically a lead-based material (e.g., PbO, $PbO_2$, Pb or $PbSO_4$ at different charge/discharge stages of the battery) that is pasted, deposited, or otherwise provided onto the grids. The paste composition may be determined by power requirements, cost, and battery environment, as it is known in the art. In various embodiments, active material 116 of a lead-acid battery is prepared by mixing lead oxide, sulfuric acid, and water. The lead oxide reacts with the sulfuric acid to form mono-, tri-, and/or tetra-basic lead sulfate(s). Dry additives, such as fiber and expander, may also be added to the active material. For example, in various embodiments, expanders such as finely-divided carbons (e.g., lampblack or carbon black), barium sulfate, and various lignins may be included in the active material. In various embodiments, the mixture is then dried and water is re-added to form a paste of the desired consistency.

The active material provided on the positive grid (e.g., lead dioxide [$PbO_2$]), is typically in micro-particle form, so that the electrolyte is allowed to diffuse and permeate through the lead dioxide microparticles on the positive electrode plate. The spongy lead, the active material of the negative electrode plate, is typically porous and reactive, so that the electrolyte is allowed to diffuse and permeate through the sponge lead on the negative electrode plate.

Figure 6:
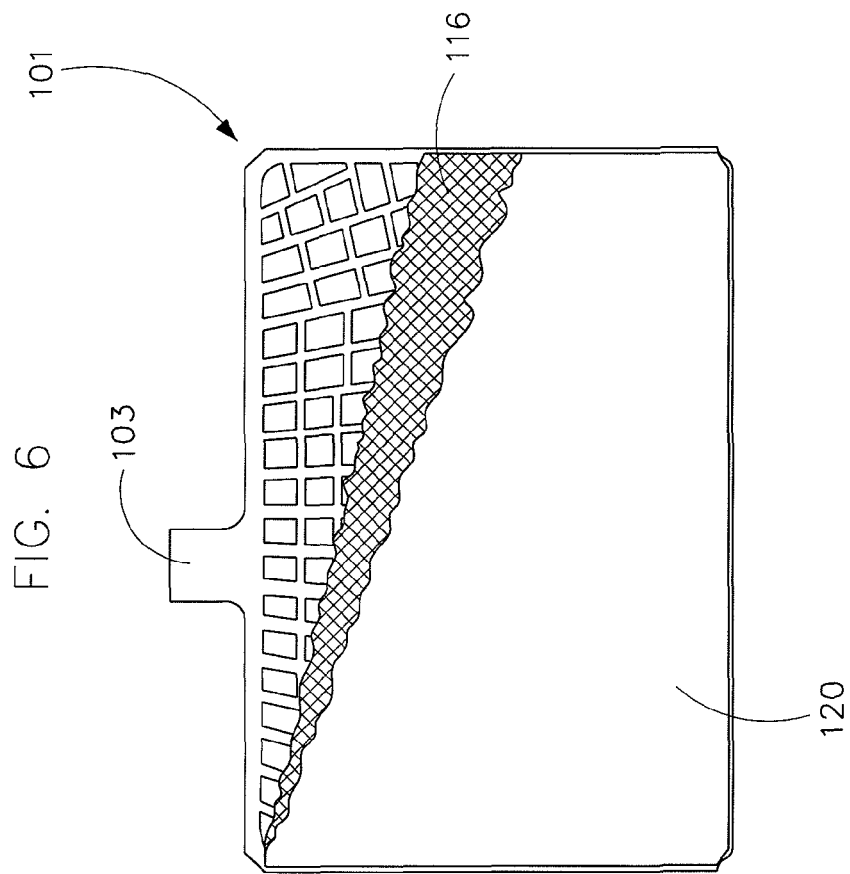
FIG. 6 is a front plan cut-away view of a battery plate or electrode (e.g., positive battery plate) including a grid, active material and a pasting textile or scrim according to an exemplary embodiment.
Figure 9:
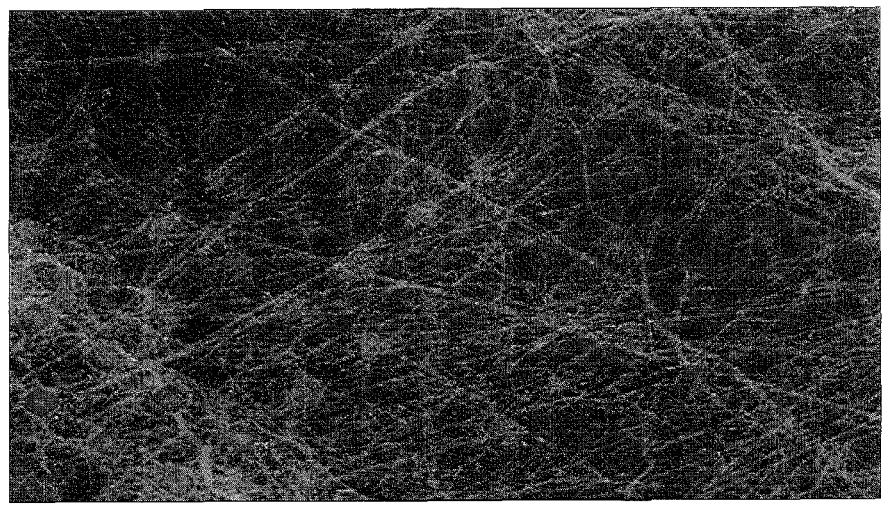
FIG. 9 is a 10× magnified view of a pasting textile or scrim according to a second exemplary embodiment.
Figure 10:
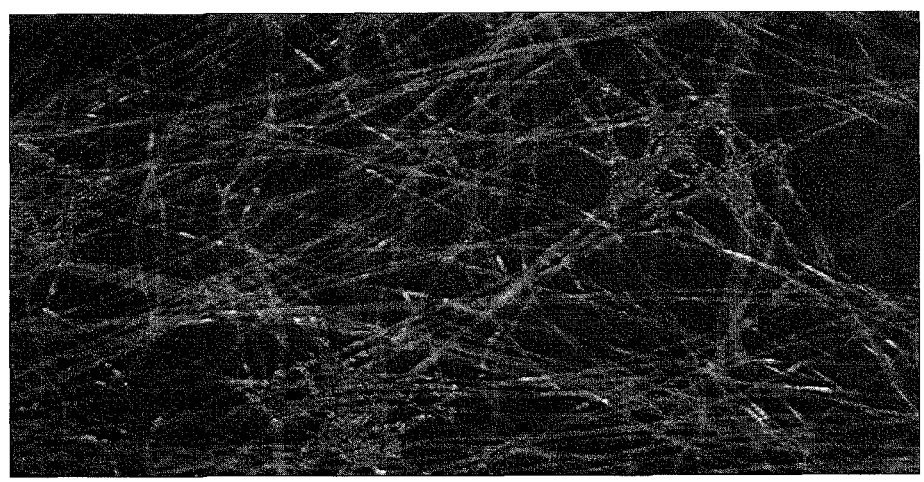
FIG. 10 is a detailed view of a portion of the pasting textile depicted in FIG. 9.
Figure 11:
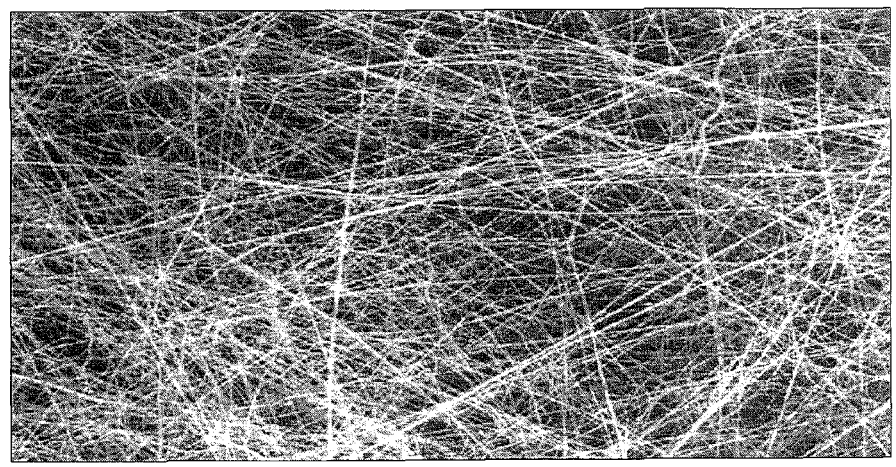
FIG. 11 is a 10× magnified view of a pasting textile or scrim according to a third exemplary embodiment.
Figure 12:
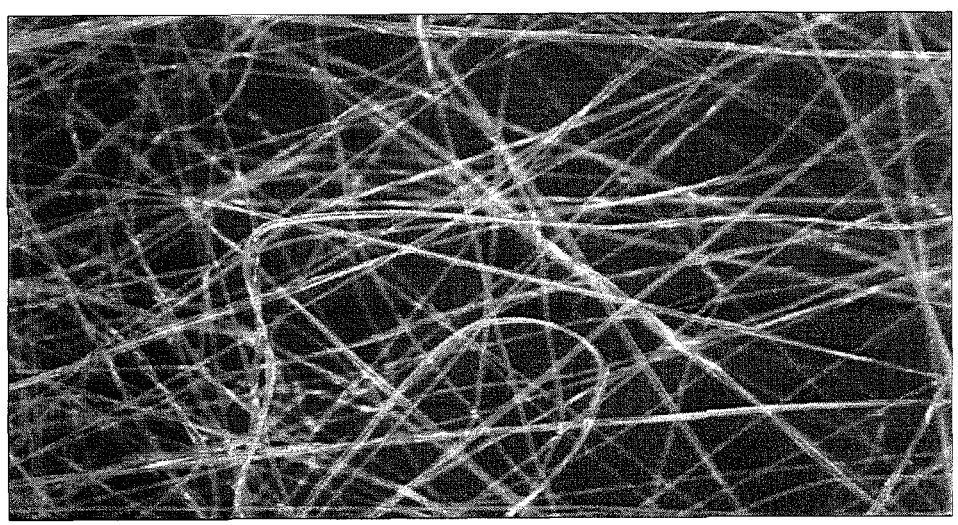
FIG. 12 is a detailed view of a portion of the pasting textile depicted in FIG. 11.
Figure 13:
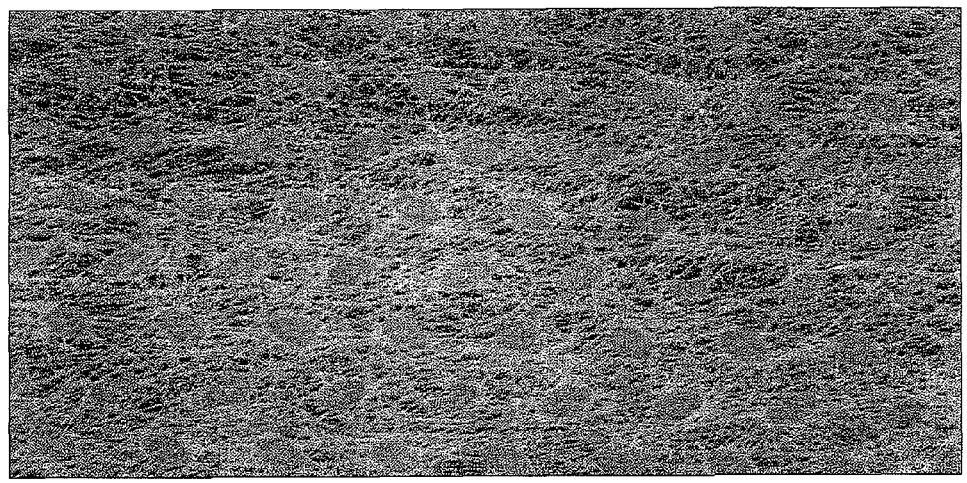
FIG. 13 is a 10× magnified view of a pasting textile or scrim according to a fourth exemplary embodiment.
Figure 14:
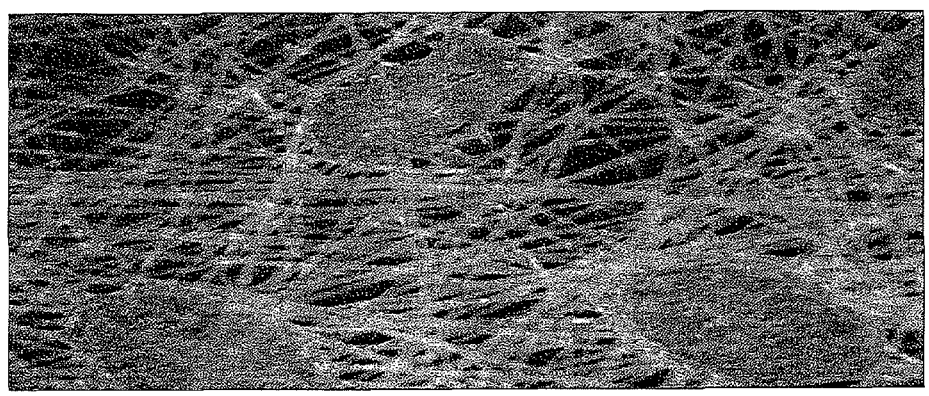
FIG. 14 is a detailed view of a portion of the pasting textile depicted in FIG. 13.
Figure 15:
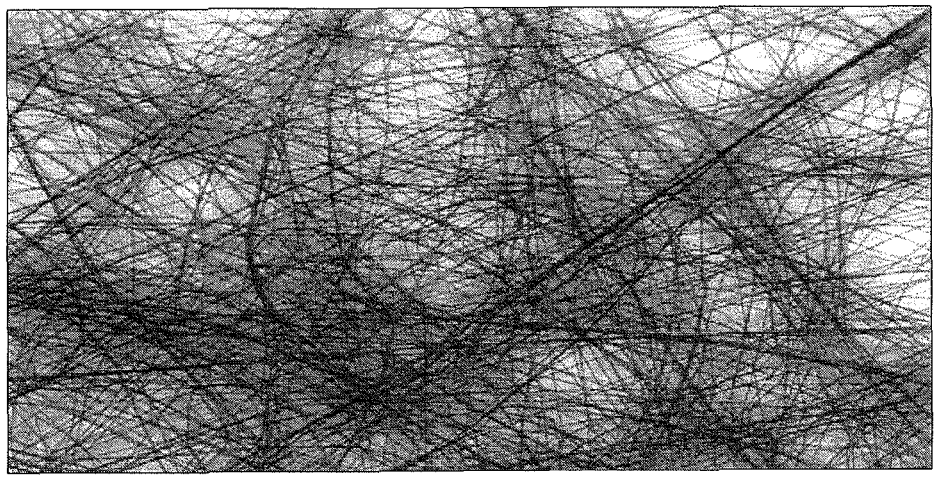
FIG. 15 is a 10× magnified view of a pasting textile or scrim according to a fifth exemplary embodiment.
Figure 16:
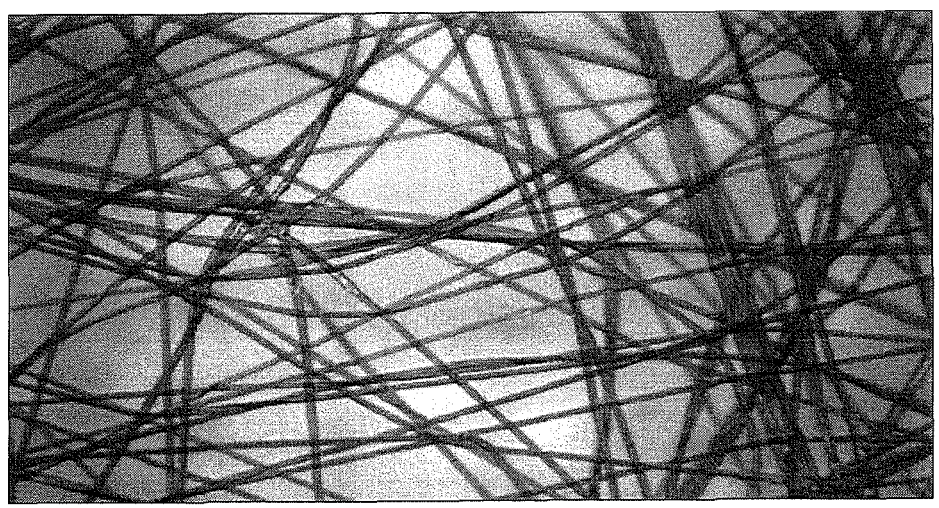
FIG. 16 is a detailed view of a portion of the pasting textile depicted in FIG. 15.
Figure 17:
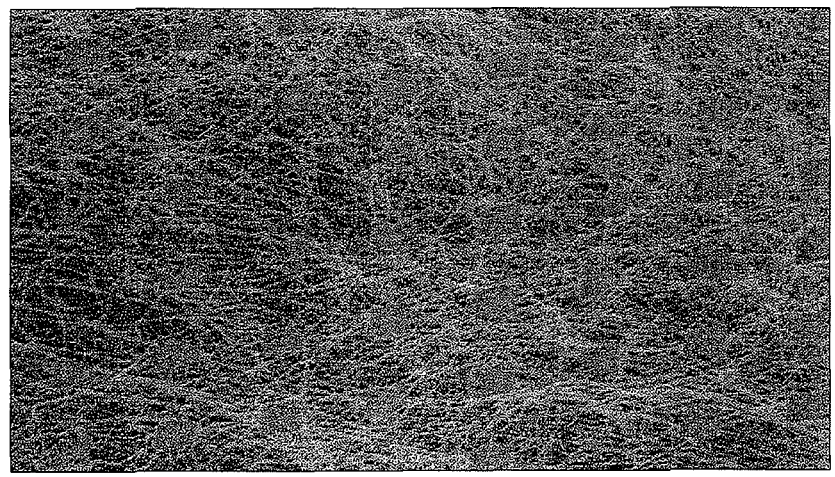
FIG. 17 is a 10× magnified view of a pasting textile or scrim according to a sixth exemplary embodiment.
Figure 18:
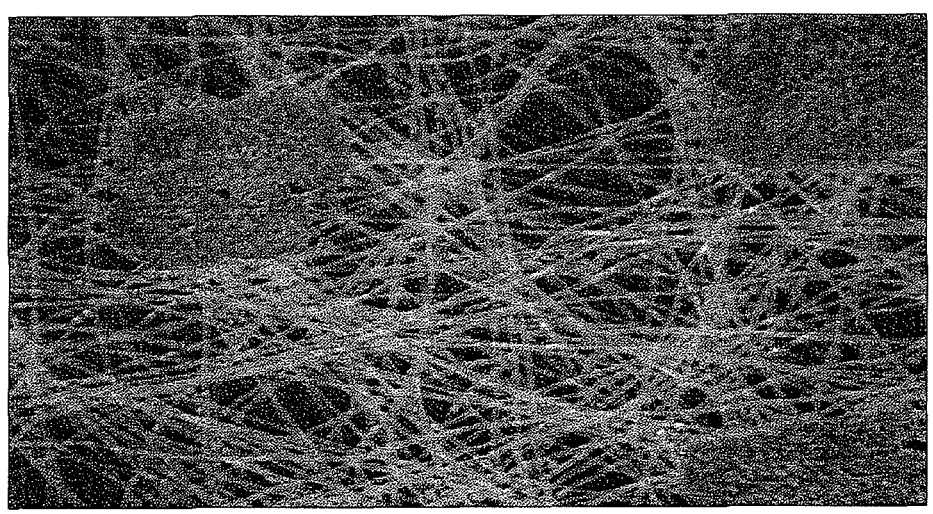
FIG. 18 is a detailed view of a portion of the pasting textile depicted in FIG. 17.
Figure 19:
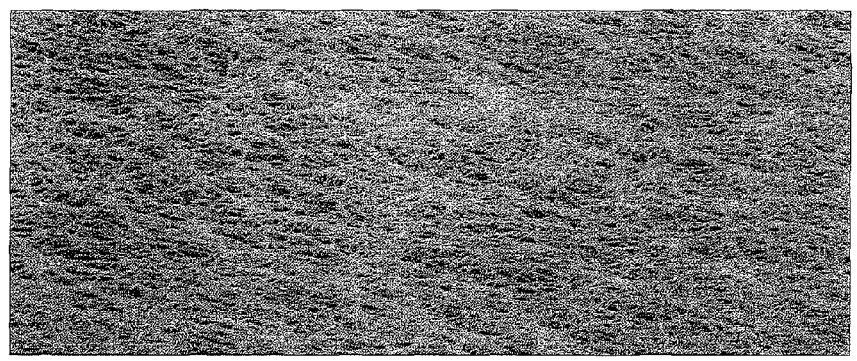
FIG. 19 is a 10× magnified view of a pasting textile or scrim according to a seventh exemplary embodiment.
Figure 20:
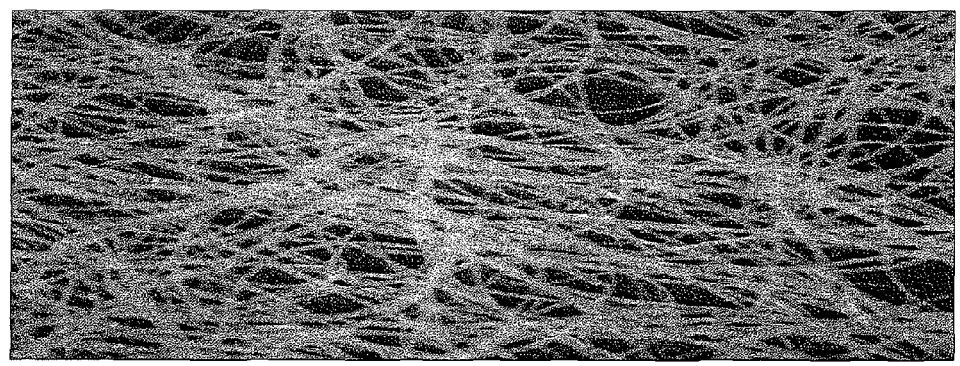
FIG. 20 is a detailed view of a portion of the pasting textile depicted in FIG. 19.
Figure 21:
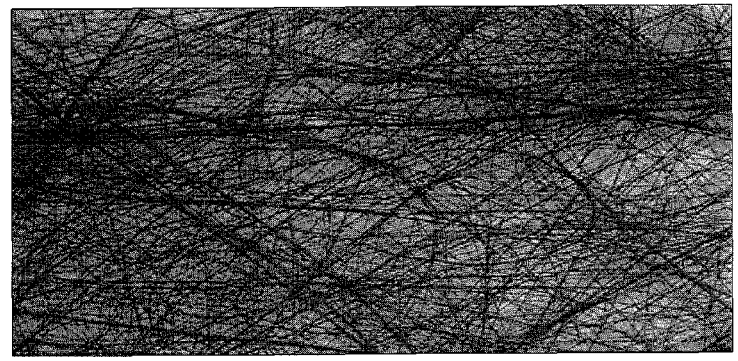
FIG. 21 is a 10× magnified view of a pasting textile or scrim according to an eighth exemplary embodiment.
Figure 22:
FIG. 22 is a detailed view of a portion of the pasting textile depicted in FIG. 21.

Referring now to FIG. 6, which is a cut-away view of a battery plate or electrode including grid 101, active material 116, and a pasting textile, fabric or scrim 120, in various embodiments, pasting textile, fabric, or scrim 120 may be provided into or onto the surface of active material 116 provided on grids 101. Pasting textiles or scrims 120, according to various embodiments, are magnified and shown in FIGS. 7 to 22. In various embodiments, pasting textile or scrim 120 may include bonded, non-woven fiber webs. More particularly, pasting textile or scrim 120 may include point-bonded, non-woven webs of fibers. Point bonding helps improve the adhesiveness of the pasting scrim material to the active material. It should be appreciated, however, that the pasting textile need not be non-woven and may be woven, loosely woven, knit, etc. Also, the pasting textile may not be bonded. In various embodiments, pasting textile or scrim 120 may be manufactured using a wet-laid process.

In various embodiments, pasting textile or scrim 120 is 0.06 to 5 mm in thickness, preferably 0.06 to 0.5 mm in thickness, and more preferably 0.06 to 0.25 mm in thickness. As one of ordinary skill in the art will appreciate, however, the thickness of the pasting textile depends in part upon the intended application and the desired properties of the battery, such as cold cranking ampere, the cycling or 20-hour rate capacity, or reserve capacity.

In various embodiments, pasting textile, fabric or scrim 120 may be used in place of conventional pasting paper. In other embodiments, the pasting textile (e.g., non-woven material or scrim) may be laminated to or otherwise provided on conventional pasting paper to improve the characteristics and properties of an electrode utilizing such pasting paper or a battery utilizing an electrode utilizing such pasting paper. As one will appreciate, a thinner pasting textile or scrim than that described above may be utilized where it is laminated, coupled to, or otherwise provided on a pasting paper.

In various embodiments, the pasting textile may be used in conjunction with or in addition to traditional pasting paper or material. For example, in various embodiments, the pasting textile or scrim may be used in place of conventional pasting material in connection with the positive electrodes only. In various other embodiments, the pasting textile or scrim may be used in place of conventional pasting paper in only the negative electrodes. In those embodiments where the pasting textile or scrim 120 is used in place of conventional pasting paper in connection with one type of electrode (e.g. in positive electrodes or negative electrodes), and where conventional pasting paper or material is used in connection with the other type of electrode, visual distinctions between the pasting textile or scrim 120 and conventional pasting paper or material may make it easier during manufacturing to differentiate the between positive plates and the negative plates, and can reduce confusion and inadvertent misidentification of plates (e.g., negative plates for positive plates or vice versa).

In various embodiments where the pasting textile or scrim is used in place of conventional pasting paper in connection with multiple types of electrodes (e.g., positive electrodes and negative electrodes), the pasting textile used in connection with one type of electrode (e.g., positive electrodes) may be visually distinct (e.g., colored or pigmented differently) from that used with the other types of electrodes (e.g., negative electrodes) to improve ease of differentiation between positive electrodes and the negative electrodes, thereby reducing confusion and inadvertent misidentification of such electrodes.

In various embodiments, pasting textile or scrim 120 has a weight range or density range of about 0.15 ounces per square yard to about 2.0 ounces per square yard. Again, as with thickness, the preferred weight or density range of the pasting textile depends in part upon the intended application or desired performance characteristics, such as cold cranking ampere, cycling or 20-hour rate capacity, or reserve capacity. In various embodiments, the choice of weight range or density may also modify the nature of bonding between the pasting textile and the active material in its native form. In various embodiments, the weight or density range depends upon conventional manufacturing processes and limitations such that the electrode may be easily and economically manufactured utilizing conventional battery manufacturing processes, systems, and equipment.

In various embodiments, pasting textile 120 is constructed primarily of fiber or microfiber. In various embodiments, the fiber or microfiber is made of one or more thermoplastic resins, such as polyesters, polypropylene, viscous rayon, polyamides (e.g., nylons), etc.

In various embodiments, pasting textile 120 is made from a spun, continuous fiber. Use of a spun, continuous fiber helps improve acid transport and adhesion of pasting textile 120 to active material 116. In addition, by using a continuous fiber filament, pasting textile 120 formed by such fiber exhibits improved mechanical properties because the fiber is generally in plane or parallel to the plane of pasting textile or scrim 120.

As one of ordinary skill in the art will appreciate, however, the pasting textile may be made from multiple fibers, including staple fibers or cut fibers. In various embodiments, the staple or cut fibers vary in length, and have lengths generally ranging from 1.5 to 15 mm. It should be appreciated, however, that the fibers may be of any suitable length or lengths. However, in various embodiments, the average length of the staple or cut fibers exceeds 20

In various embodiments, the fibers or microfibers have a generally rounded cross-sectional shape. In various embodiments, the fiber diameter ranges from 10 to 25 µm. In various embodiments, the fibers have a denier per fiber ranging from 1 to 10 and preferably from 2 to 4. In various exemplary embodiments, the fibers have a denier greater than about 2, but not greater than 10. In other embodiments, the fibers have a denier greater than about 2, but not greater than 4. In various embodiments, the surface of the fibers is substantially smooth, having little or no texture. In various other embodiments, the fibers may have other cross-sectional shapes.

The fiber may also include a blend or multiple components. For example, the fiber may be made of various copolymer blends. In various embodiments, the fiber is made of bi-component sheath/core fibers. In other embodiments, the fiber is a homopolymer or a monopolymer. In some embodiments, the fiber or microfiber is carbon-based (i.e., includes pure carbon or other types of carbon including, without limitation, carbon black, graphite, expanded graphite, nanotubes, nanofibers, acetylene black, and derivatives thereof). The fiber or microfiber may be made of pure carbon and/or other carbon types, or various percentages of pure carbon and/or other carbon types.

In various embodiments, the pasting textile or scrim may be loaded with one or more additives including titanium dioxide ($TiO_2$), graphite, carbon black, etc. to help in the conversion of active material during formation. In various embodiments, the pasting textile, material, or scrim and/or the fiber is chemically treated. In various embodiments, the pasting textile or fiber may be carbon treated or impregnated. In various embodiments, the pasting textile or fiber may be treated with a delustering agent such as titanium dioxide ($TiO_2$), silica, clays, talcs, oxides, etc. By treating it with a delustering agent, the pasting textile or fiber may have a surface roughness or texture that improves adherence to the active material and/or improves the wettability of the pasting textile or fiber.

In addition, the pasting textile or fiber may include surfactants or wetting agents such as water-soluble silicon to enhance wettability.

In various embodiments, the pasting scrim or textile is formed by creating a web from a single continuous fiber and cutting the web to the desired shape and size. In such embodiments, the average length of the fibers after the pasting textile is cut out of the web is substantially equal to the average of the length and width of the pasting textile. In various embodiments, the pasting scrim or textile may be formed in one step on the battery electrodes or may be formed in a separate process and applied onto the electrode plates in a subsequent step. In embodiments where the pasting textile or scrim is formed on the electrode plates, a pasting textile or scrim sheet is provided on a sheet of pasted grids or plates prior to the sheet being cut into individual pasted grids or plates.

Referring again to FIG. 5, in various embodiments, one or more battery separators 106 are used to conductively separate the positive and negative electrodes. The separator material is typically microporous to allow the through passage of ions from the positive and negative electrodes. Separators for automotive batteries are typically made in continuous lengths and rolled, subsequently folded as shown in FIG. 5, and sealed along one or more of their edges to form pouches that receive a battery plate (e.g., a negative plate as shown in FIG. 5 or a positive plate as shown in FIG. 2).

In various embodiments, separator material generally has a substantially uniform thickness and a substantially uniform pore distribution. The pore distribution helps ensure an overall uniform current density during operation, thereby helping achieving a uniform charging and discharging of the electrodes and maximum battery efficiency. A separator 106 generally incorporates one or more ribs (e.g., as shown in FIG. 5) to help stiffen the separator.

In various exemplary embodiments, the fiber scrim cloth that replaces both the conventional pasting paper and the separator (e.g., a glass mat separator) with a single sheet of material. Batteries constructed according to an exemplary embodiment have significantly improved reserve capacity compared to conventional baseline batteries. Elimination of the pasting paper, which decomposes in the battery environment, results in reduced material costs, increased processing speed, and improved process cleanliness (e.g., dust from the pasting paper is eliminated). Elimination of the glass mat separator also reduces processing equipment downtime and maintenance delays.

Conventional lead-acid batteries cannot withstand the cycling requirements of micro-hybrid vehicles. However, a lead-acid battery with a cloth fiber scrim in place of conventional pasting paper and separator, according to an exemplary embodiment, is capable of operating under the higher cycling requirements of applications such as start-stop micro-hybrid applications for which conventional lead-acid batteries are inappropriate.

The separator material may be constructed of a variety of materials (e.g., polyolefin, rubber, phenol-formaldehyde resorcinol, glass mat, microporous PVC, and sintered PVC). In various embodiments, the separator 106 is comprised of a microporous sheet comprised of high molecular weight polyolefin. Examples of polyolefins that may be used include polyethylene, polypropylene, polybutene, ethylene-propylene copolymers, ethyl ene-butene copolymers, propylene-butene copolymers, and ethylene-propylene-butene copolymers.

In various embodiments, a separator 106 also includes at least one plasticizer. The plasticizer may be soluble or insoluble in water. Examples of plasticizers that may be used include organic esters, epoxy compounds, phosphate esters, hydrocarbon materials, and low molecular weight polymers.

In various embodiments, the separator 106 is also constructed of an inert filler material. The filler can be soluble or insoluble in water. However, the filler may provide the primary means by which any plasticizer is absorbed and held in the composition and should not be soluble in the plasticizer. The preferred filler is dry, finely divided silica. However, other fillers (e.g., carbon black, coal dust, graphite, metal oxides and hydroxides, metal carbonates, minerals, zeolites, precipitated metal silicates, alumina silica gels, wood flour, wood fibers and bark products, glass particles, salts such as barium sulfate, inorganic salts, acetates, sulfates, phosphates, nitrates, carbonates, and/or combinations thereof) may be utilized. It should also be understood that any known or later-developed wetting agents (e.g., sodium alkyl benzene sulfonate, sodium lauryl sulfate, dioctyl sodium sulfosuccinate, and isoctyl phenyl polyethoxy ethanol) may be utilized to enhance the wettability of the filler.

In various embodiments, the separator 106 is comprised of a stabilizer or an antioxidant. In various embodiments, conventional stabilizers or antioxidants such as 4,4 thiobis (6-tert-butyl-m-cresol) ("Santonox"), and 2,6-di-tert-butyl-4-methylphenol ("Ionol") may be utilized.

When the separator 106 is provided with one or more ribs, the ribs may be formed from a number of known or later-developed polymeric compositions (e.g., the same composition as the separator, other polyolefins, polyvinyl chloride, and/or filled or foamed compositions thereof). The ribs may be provided in any number of ways. For example, the ribs may be formed by extrusion (either unitarily with the sheet or separately). The ribs may also be formed by grooving or embossing. When ribs are molded separately, they may be bonded or otherwise coupled to the sheet or base web by any number of methods known in the art including heat sealing or by an adhesive.

While a particular rib configuration is shown in FIG. 5, one skilled in the art will appreciate that any variety of rib configurations may be utilized depending at least in part on the grid design, plate design, and/or battery.

The thickness of a separator 106 will vary depending upon the type of battery 100 in which it is used. In general, the thickness of the base web can range from 1 to 50 milli-inches ("mils"). For lead-acid batteries, the preferred thickness range is typically 10 to 40 mils. The height of each rib may vary over a wide range depending upon plate spacing requirements. Generally, ribs from 5 to 200 mils in height from the base are provided, with the preferred range being 10 to 100 mils.

Various chemistries in which the electrochemical potential between various materials is used to generate electricity have been studied and commercially implemented. See, in general: Besenhard, J. O., Ed., *Handbook of Battery Materials*, Wiley-VCH Verlag GmbH, Weinheim, Germany, 1999; and Linden, D., Ed., *Handbook of Batteries*, Second Edition, McGraw Hill Inc., New York, N.Y., 199, both of which are incorporated herein by reference.

A plate for a lead-acid battery is conventionally made by applying active material or paste to a conductive support such as a lead alloy grid material. Plates can be classified according to the method of manufacturing the same. For example, one process for producing battery plates includes an initial step of melting hot lead in a furnace, followed by a step of feeding molten lead alloy to a strip caster. In the strip expansion process, a cast or wrought lead strip is typically pierced, stretched above and below the strip plane, and then pulled or expanded to form a grid with a diamond pattern. In various embodiments, the strip is coiled on a winder, and coils of lead alloy strip are stored for later use. In various embodiments, the strip may also be rolled. To form a battery grid material, in various embodiments, the strip is fed through an expander that cuts, slits, and stretches a strip of coil to form the grids.

The grid material may be produced using other known or later-developed processes. For example, as discussed above, the grid material may be formed by a casting process (e.g., by pouring a melted alloy into a mold), a stamping process, or by continuous rolling. During the manufacture of the grids or the plates, the grid wires may be refinished or reshaped (e.g., to improve adhesion of the paste).

The active material or paste is then applied to or otherwise provided (e.g., pasted by a conventional paster) on the expanded strip or wire grid material. In various embodiments, one or more pasting materials such as a pasting textile, fabric or scrim, or pasting papers, are provided on one or both surfaces of the active material. In various embodiments, the pasting materials or paper may be provided in a continuous process.

In various embodiments, the grid material, active material or paste and pasting material (e.g. pasting textile or scrim) is fed to a divider where the strip is cut into plates. By cutting the strip, the continuous fiber forming the pasting textile or scrim may also be cut into multiple fibers, the average length of which may be about one-half the sum of the length and width of the face of the plate cut from the strip. Plates cut from the strip may be flattened or otherwise modified to help smooth out any uneven regions of battery plate paste. In various embodiments, the plates pass (e.g., on a conveyor) through an oven for flash-drying, and may then be stacked for later use. Conventionally, flash-drying may be performed using an open gas flame or an oven, e.g., as a 10-15 second drying of the plates in a conventional blast drying oven at about 260 deg. C. (about 500 deg. F.). However, in various embodiments, electrodes or plates including a pasting textile or scrim may be dried at a lower temperature (e.g., about 93 deg. C. to about 205 deg. C. (about 200 to about 400 deg. F.)). After drying, the battery plates undergo a chemical treatment, well known to those skilled in the art. The pasted plates are next typically cured for many hours under elevated temperature and humidity to help oxidize any free lead and otherwise adjust the crystal structure of the plate.

Conventional polyolefin battery separators are typically produced by a process that comprises blending a composition of high molecular weight polyolefin, an inert filler material, and/or a plasticizer, fruiting the composition into sheet form, and subsequently extracting a portion of the inert filler and/or plasticizer from the sheet using a solvent.

After curing, the plates are assembled into batteries. Groupings of individual battery plates may be assembled, enveloped, interleaved or otherwise separated with separator material, and provided together to form plate sets. For example, in one common battery design, every other plate (e.g., each negative plate) in the battery set is inserted into a battery separator in the form of an envelope. The envelope acts as a separator between the plate in the envelope and the adjoining plates in the battery set. The plate sets are assembled in a container to help form a battery.

During assembly, the lugs of the positive battery plates are coupled together and the lugs of the negative battery plates are coupled together. This is typically accomplished using cast-on straps Rained by taking assembled battery stacks, inverting them, and dipping the lugs into molten lead provided in a mold. To permit current to follow throughout the battery, cast-on straps of stacks are joined or coupled. Moreover, terminal electrodes and are provided which extend through the cover or casing to permit electrical contact with a vehicle's electrical system or other system requiring or intended to use battery power.

In various embodiments, the battery housing, including the cover, is provided containing the battery cells. In various embodiments, the battery housing is submerged in acidic electrolyte fluid in order to fill the battery housing with electrolyte fluid through the fill tube holes in the battery cover. After filling the battery housing with electrolyte fluid, the battery is removed from the electrolyte fluid. Any residual electrolyte fluid coating, dust, and other debris may be washed away to prepare the battery for shipment. Before washing the battery housing external surfaces, the fill tube holes may be plugged to prevent washing fluid from entering the battery housing.

Following the initial wash, the batteries are electrochemically formed by passage of current to convert the lead sulfate or basic lead sulfate(s) to lead dioxide (positive plates) or lead (negative plates). This is referred to as the "formation" process.

The invention is further illustrated in the following Examples which are presented for purposes of illustration and not of limitation.

EXAMPLE 1

A lead storage battery for start-stop applications was assembled using electrodes manufactured as described above. More specifically, the positive electrodes included a stamped grid (i.e., PowerFrame™ grid), active material and the pasting textile or scrim shown in FIGS. 7 and 8. The pasting textile was constructed of a continuous PET homopolymer having a round cross section and generally smooth texture. The pasting textile was point-bonded with a weight of 0.5 oz. per square yard and a thickness of 4.3 mils. The microfiber diameter was about 12-16 μm and the fiber denier was about 2.2 per fiber.

Figure 23:
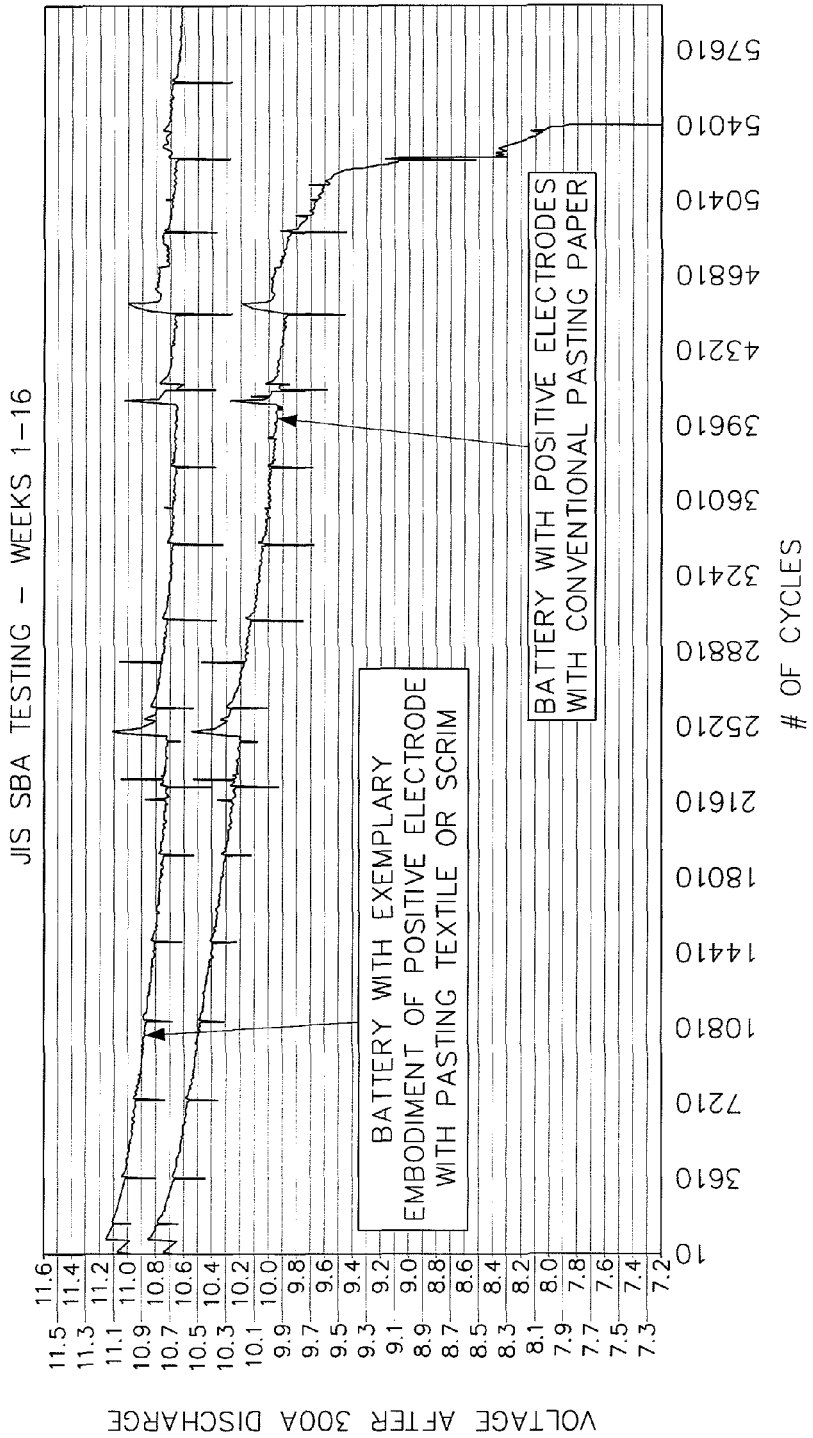
FIG. 23 is a graph comparing the stop start cycling capacity of a battery utilizing electrodes including a pasting textile or scrim according to an exemplary embodiment compared to an electrode including conventional pasting paper.

The stop/start cycling properties of the assembled battery was tested against the stop/start cycling properties of a battery having similarly-constructed negative electrodes and polyethylene separators, and positive electrodes including a stamped grid (i.e., PowerFrame™ grid), active material and a conventional pasting paper provided thereon. A graph comparing the stop/start cycling capacity of two batteries is shown in FIG. 23.

EXAMPLE 2

An improved flooded lead storage battery was assembled using electrodes manufactured as described above. More specifically, the positive electrodes included a stamped grid (i.e., PowerFrame™ grid), active material and the pasting textile or scrim shown in FIGS. 7 and 8. The pasting textile was constructed of a continuous PET homopolymer having a round cross section and generally smooth texture. The pasting textile was point-bonded with a weight of 0.5 oz. per square yard and a thickness of 4.3 mils. The microfiber diameter was about 12-16 μm and the fiber denier was about 2.2 per fiber.

Figure 24:
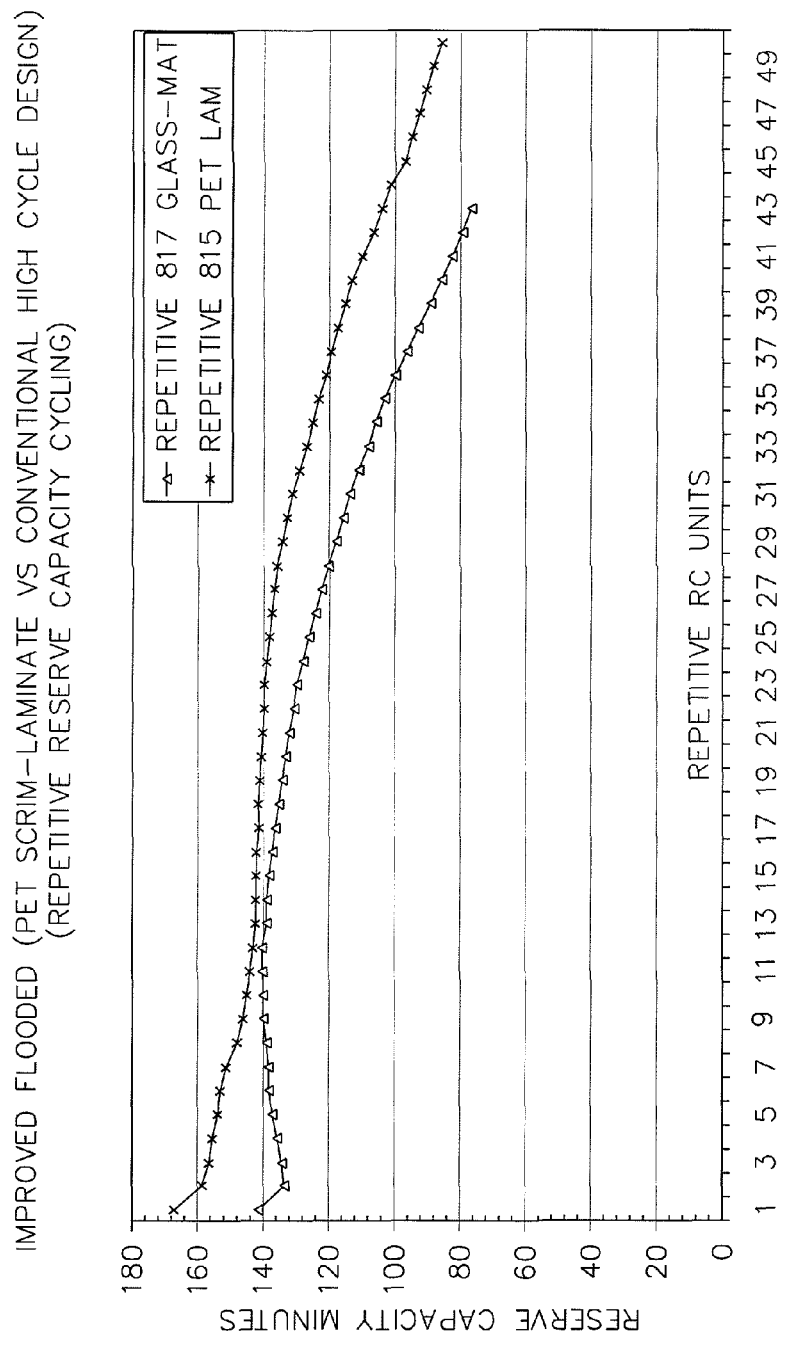
FIG. 24 is a graph comparing the repetitive reserve capacity cycling of a battery including positive electrodes (including a pasting textile or scrim according to an exemplary embodiment) and a conventional polyethylene separator to a battery including positive electrodes (including conventional pasting paper) and a conventional glass mat separator.
Figure 25:
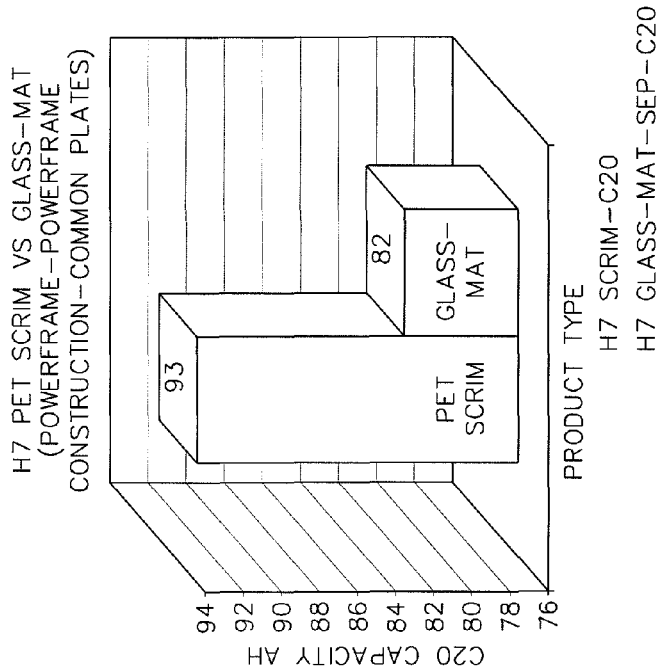
FIG. 25 is a graph comparing the reserve capacity of a battery including positive electrodes (including a pasting textile or scrim according to an exemplary embodiment) and a conventional polyethylene separator to a battery including positive electrodes (including conventional pasting paper) and a conventional glass mat separator.
Figure 26:
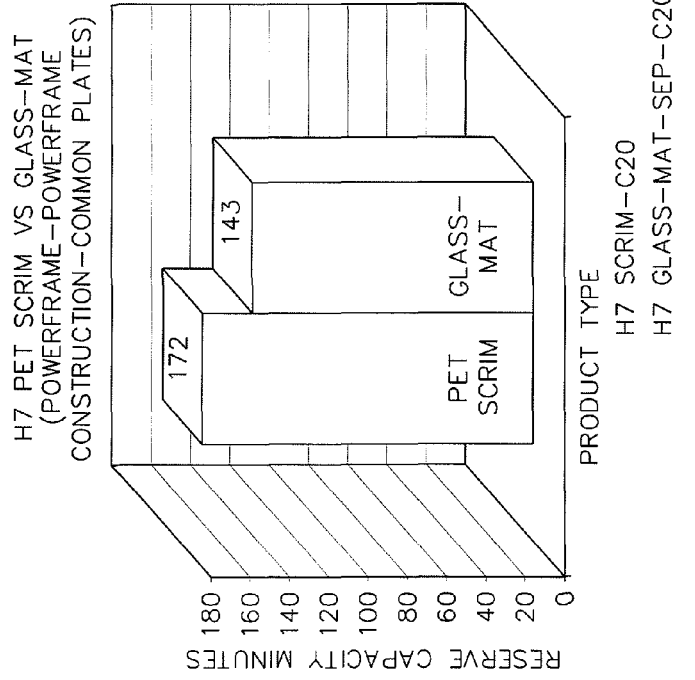
FIG. 26 is a graph comparing the C20 capacity of a battery including positive electrodes (including a pasting textile or scrim according to an exemplary embodiment) and a conventional polyethylene separator, and a battery including positive electrodes (including conventional pasting paper) and a conventional glass mat separator.
Figure 27:
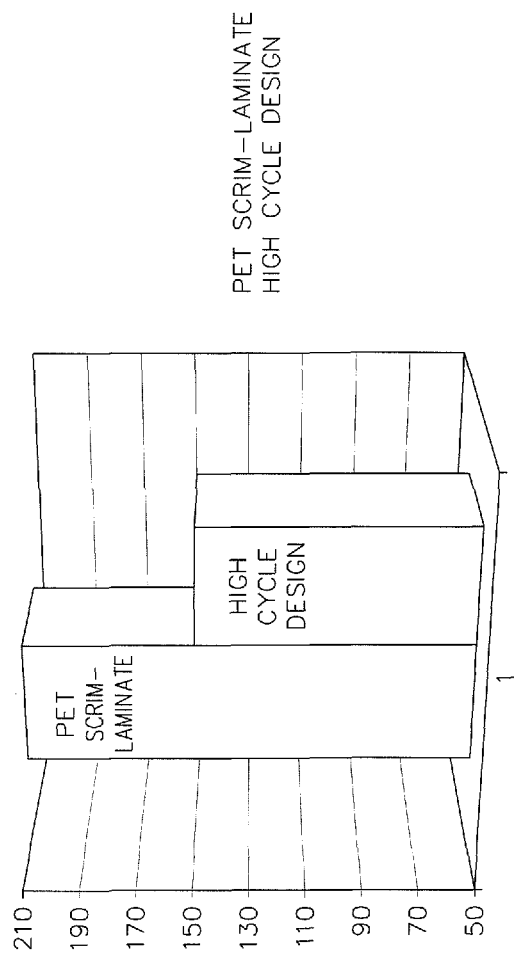
FIG. 27 is a graph comparing the life-cycle test sequences of a battery including positive electrodes (including a pasting textile or scrim according to an exemplary embodiment) and a conventional polyethylene separator to a high cycle design battery including positive electrodes (including conventional pasting paper).

The repetitive reserve capacity cycling of the assembled lead storage battery was tested, measured and compared against the repetitive reserve capacity cycling of a battery having electrodes using similar grids and active material, but positive electrodes including pasting paper instead of a pasting textile, and glass mat separators which are common or standard in high cycling applications. A graph comparing the repetitive reserve capacity cycling of the two batteries as shown in FIG. 24. In addition, bar graphs showing the reserve capacity minutes and C20 capacity in amp-hours of the two batteries are shown in FIGS. 25 and 26, respectively. A bar graph comparing the EN 50% DOD life cycle testing of the two batteries is shown in FIG. 27.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the FIGURES. It should be recognized that the orientation of particular components may vary greatly depending on the application in which they are used.

For the purpose of this disclosure, the termm "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

For the purpose of this disclosure, the term "electrically coupled" means the joining or connecting of two or more members directly or indirectly to one another in such a manner that electrical current may from between the members. Such electrical connection may be stationary or movable in nature. Such electrical connection may be achieved with the two members or the two members and any additional intermediate members being integrally formed as a single unitary body with one another or with the two members or the two members and any additional intermediate members being attached to one another. Such electrical connection may be permanent in nature or may be removable or releasable in nature.

It is also important to note that the construction and arrangement of the battery and/or battery components as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, and/or the nature or number of adjustment positions provided between the elements may be varied (e.g., by variations in the number of engagement slots or size of the engagement slots or type of engagement). The order or sequence of any process or method steps may be varied or re-sequenced according to alternative embodiments. Other substitutions, modifications, changes, and omissions may be made in the design, operating conditions, and arrangement of the various exemplary embodiments without departing from the spirit or scope of the present inventions.

What is claimed is:

1. A battery electrode comprising:
a grid having a perimeter;
an active material provided on the grid; and
a pasting textile provided on or into the active material, the pasting textile has a thickness of about 0.06 mm to about 5 mm;
wherein the pasting textile includes a fiber web including one or more fibers having an average length greater than 20 μm;
wherein the fibers are about 1 to about 10 denier per fiber; and
wherein the fibers comprise one or more thermoplastic resins.

2. A battery electrode comprising:
a grid having a perimeter;
an active material provided on the grid; and
a pasting textile provided on or into the active material, the pasting textile has a thickness of about 0.06 mm to about 5 mm;
wherein the pasting textile includes a fiber web including one or more fibers having an average length greater than 20 μm;
wherein the fibers are about 1 to about 10 denier per fiber; and
wherein the fibers comprise at least one of the group consisting of polyesters, polypropylene, viscous rayon, or polyamides.

3. The battery electrode of claim 1 wherein the one or more fibers have an average length equal to approximately half of a sum of a length and a width of the grid.

4. The battery electrode of claim 1 wherein the average length of the fibers is from 1.5 mm to 15 mm.

5. The battery electrode of claim 1 wherein the fiber web is point-bonded and non-woven.

6. The battery electrode of claim 1 wherein the pasting textile is about 0.06 to about 0.50 mm in thickness.

7. The battery electrode of claim 6 wherein the pasting textile is about 0.06 to about 0.25 mm in thickness.

8. The battery electrode of claim 1 wherein the pasting textile has a density range of about 0.15 to about 2.0 ounces per square yard.

9. The battery electrode of claim 1 wherein the fibers have a diameter from 10 to 25 μm.

10. The battery electrode of claim 1 wherein the fibers range from about 2 denier to 4 denier per fiber.

11. The battery electrode of claim 1 wherein an end of each fiber is positioned substantially near the perimeter of the grid.

* * * * *